Oct. 12, 1965  J. W. SWENSON ETAL  3,211,892
INDUSTRIAL RADIANT HEATING OVEN
Filed Oct. 9, 1961  5 Sheets-Sheet 1
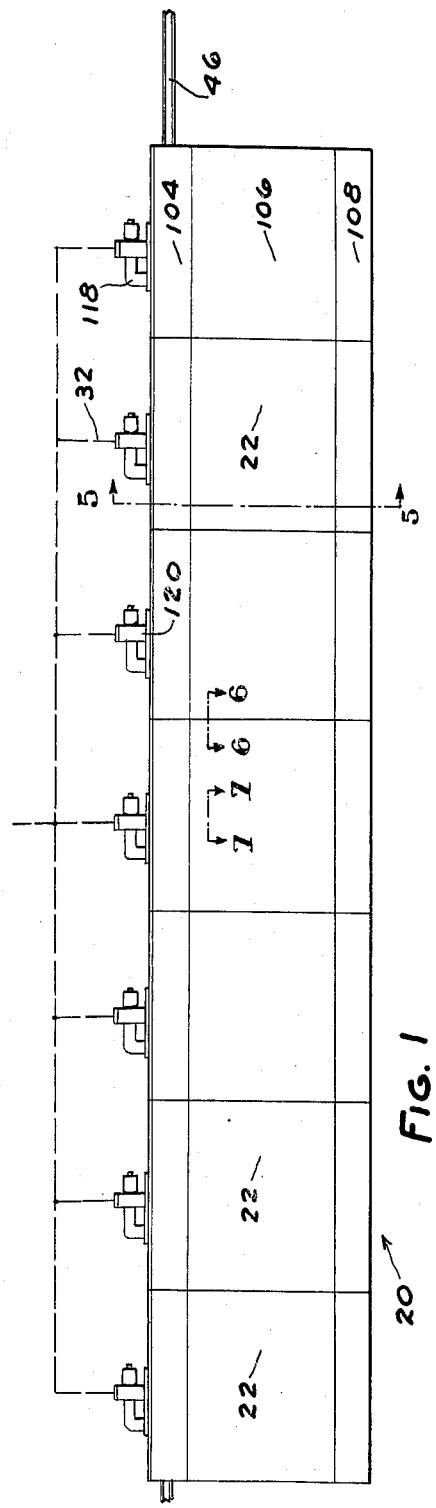
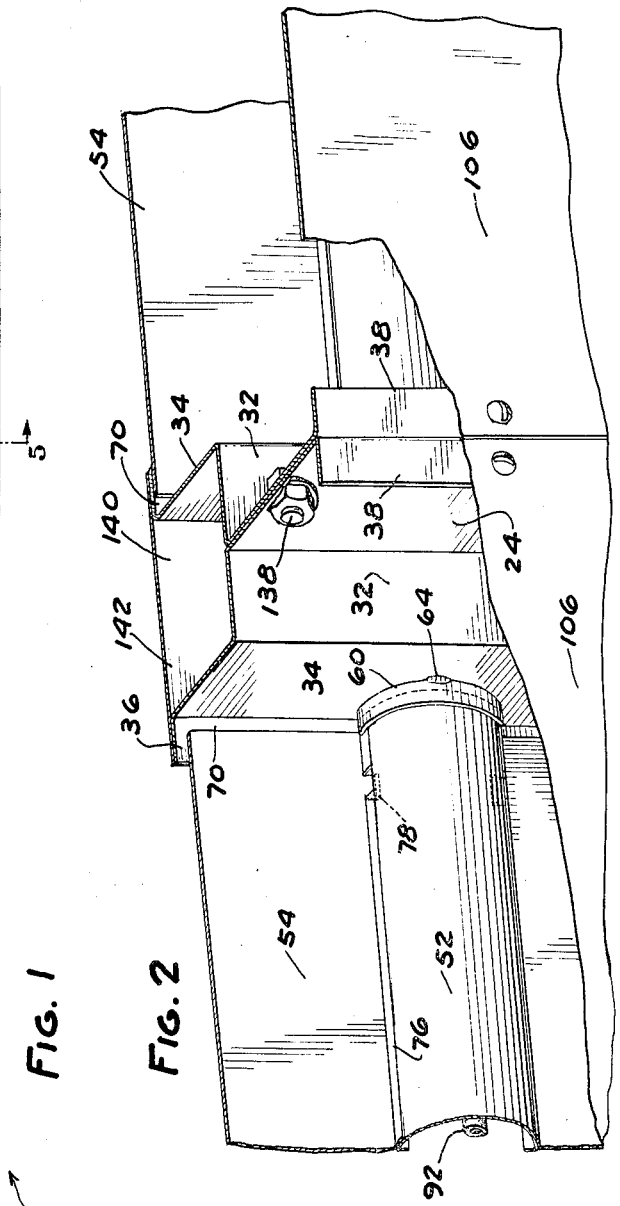
INVENTORS
JAMES W. SWENSON
& DONALD D. WATKINS
BY
Barnes, Kisselle, Raisch &
Choate
ATTORNEYS

INVENTORS
JAMES W. SWENSON
& DONALD D. WATKINS
ATTORNEYS

Oct. 12, 1965  J. W. SWENSON ETAL  3,211,892
INDUSTRIAL RADIANT HEATING OVEN
Filed Oct. 9, 1961  5 Sheets-Sheet 3

INVENTORS
JAMES W. SWENSON
& DONALD D. WATKINS
BY
Barnes, Kisselle, Raisch & Choate
ATTORNEYS Oct. 12, 1965    J. W. SWENSON ETAL    3,211,892
INDUSTRIAL RADIANT HEATING OVEN
Filed Oct. 9, 1961    5 Sheets-Sheet 4

INVENTORS
JAMES W. SWENSON
& DONALD D. WATKINS
BY
Barnes, Kisselle, Raisch & Choate
ATTORNEYS Oct. 12, 1965   J. W. SWENSON ETAL   3,211,892
INDUSTRIAL RADIANT HEATING OVEN
Filed Oct. 9, 1961   5 Sheets-Sheet 5
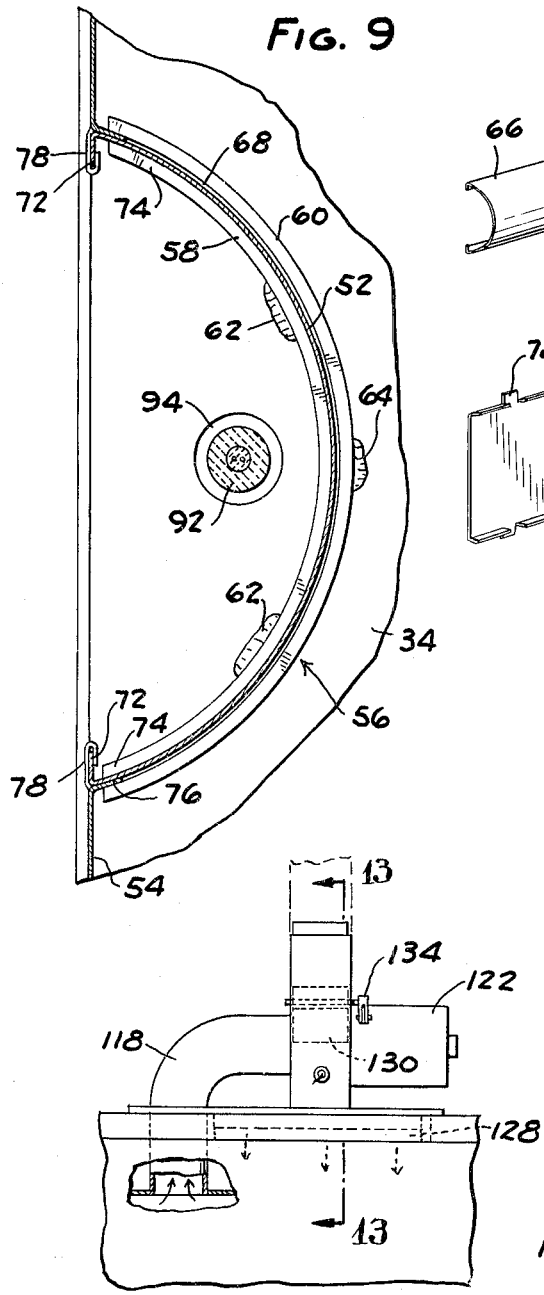
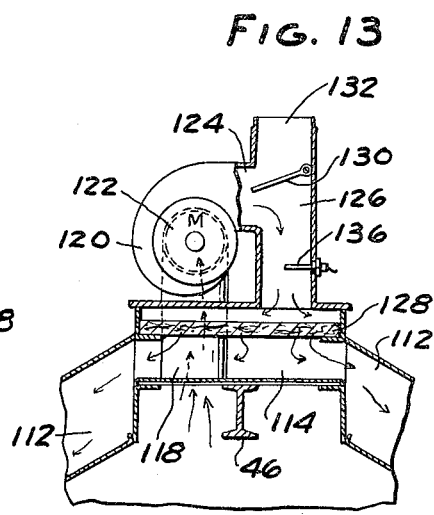
INVENTORS
JAMES W. SWENSON
& DONALD D. WATKINS
BY
Barnes, Kisselle, Raisch & Choate
ATTORNEYS

3,211,892
INDUSTRIAL RADIANT HEATING OVEN
James W. Swenson and Donald D. Watkins, Detroit, Mich., assignors, by mesne assignments, to Auto Bake Incorporated, Detroit, Mich., a corporation of Michigan
Filed Oct. 9, 1961, Ser. No. 143,639
12 Claims. (Cl. 219—411)

The object of this invention is to provide an industrial radiant heating oven structure which is simple and inexpensive to build and maintain, which is adapted to modular or sectional construction to provide ovens of different sizes, which has adequate provision for differential thermal expansion and contraction of its components, and which facilitates an improved system for controlling the amount of heat radiated to an article in the oven.

Generally the invention contemplates an oven section having a steel frame with light weight, inexpensive reflectors and reflective panels of sheet aluminum or the like which are mounted with a sliding fit on aligned pairs of semi-circular channels on the frame members. The reflective panels have both longitudinal and lateral clearance to facilitate differential thermal expansion, and the supporting channels have a break-away welded connection to the frame members rather than a bolted construction.

The reflective panels cooperate with outer housing panels on the frame members to define a passageway so that air can be circulated through the oven interior and the passageway. The temperature of the recirculated air, which is heated by an article in the oven, is used to control the radiant heating elements so that in effect the article provides its own heat control. One form of the invention is shown in the accompanying drawings.

FIG. 1 is a diagrammatic side elevation of an oven made up of a number of oven sections according to this invention.

FIG. 2 is an enlarged fragmentary perspective view adjacent the joint between the oven sections, parts being broken away to illustrate structure.

FIG. 9 is an enlarged sectional view on line 9—9 of FIG. 6.

FIG. 10 is a perspective view of a reflector.

FIG. 11 is a perspective view of a reflective panel.

FIG. 12 is a fragmentary partly sectional view of the air circulating apparatus.

FIG. 13 is a sectional view on line 13—13 of FIG. 12.

Figure 3:
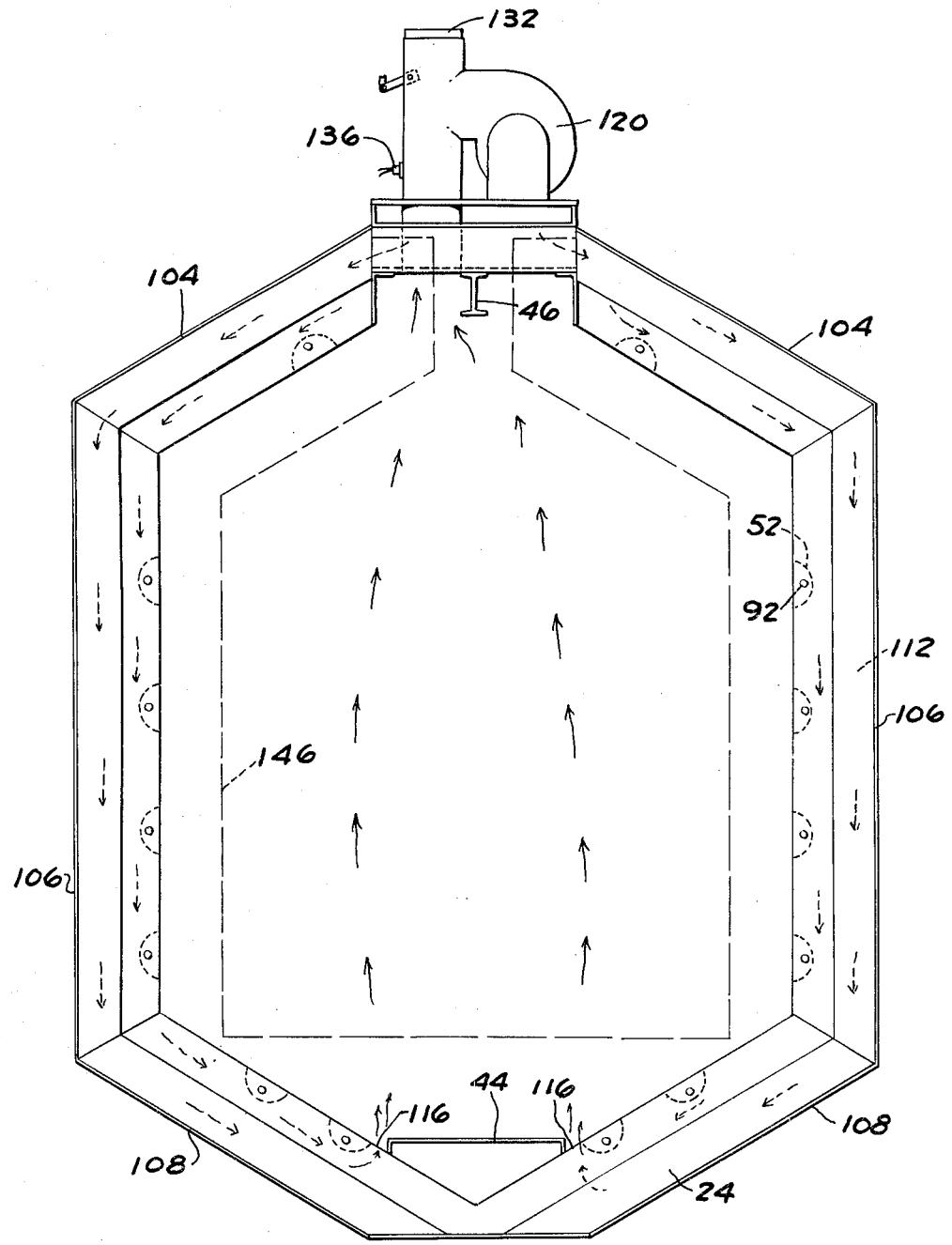
FIG. 3 is generally an end elevation of an oven section.

Shown in FIG. 1 is an oven 20 composed of a number of oven sections 22 according to this invention secured together to provide in effect a single elongate oven interior. Each oven section has a frame made of a structurally rigid material such as steel and including a channel shaped frame member 24 adjacent each end. Since the overall shape of the illustrated oven is six-sided, these frame members are also fabricated in the six-sided conformation shown. The end frame members are longitudinally interconnected by channels 26. The top of each end frame member serves as a crossbeam 28. The frame has a central six-sided channel member 30 also connected to longitudinal channels 26 and whose top also comprises a crossbeam (not shown) similar to crossbeam 28.

Each end member 24 has an intermediate shoulder 32 and an inwardly extending leg 34 terminating in a flange 36. The outer edges of frame members 24 are also flanged as at 38. A number of welded angles 40 project inwardly of frame members 30 and support an intermediate channel or shell 42 which opens inwardly. A cat walk 44 is welded to the bottom portions of the frame members, and a beam 46 is supported by crossbeams 28 for suspending articles within the oven section.

Legs 34 of the end frame members and the side walls 48 and 50 of intermediate channels 42 provide supports for concave reflectors 52 and intermediate reflective panels 54. The mounting means for the various reflectors comprises a number of aligned pairs of channels on uprights 34, 48, 50 with the channels 56 of each pair opening toward each other for receiving the ends of the reflectors.

Figure 6:
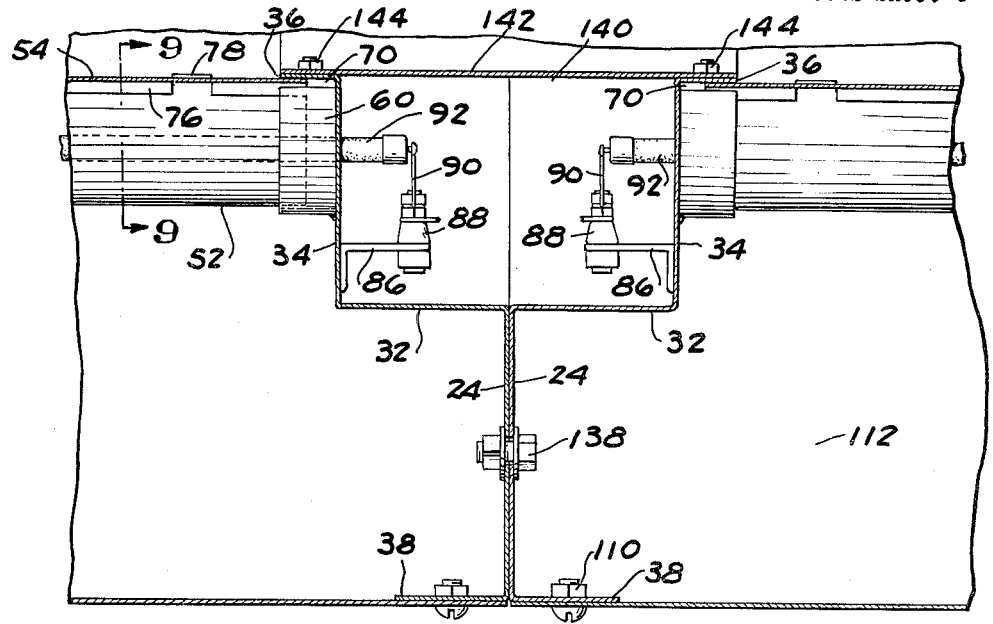
FIG. 6 is an enlarged sectional view on line 6—6 of FIG. 1.
Figure 7:
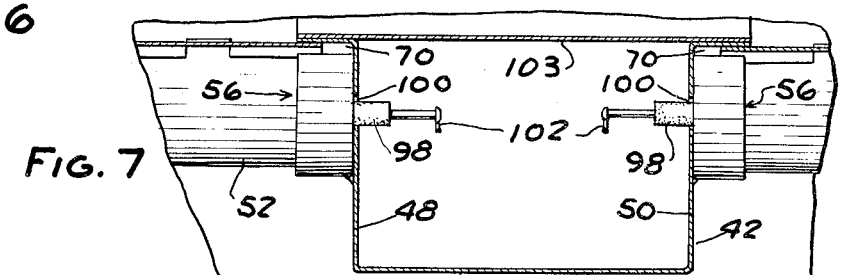
FIG. 7 is an enlarged sectional view on line 7—7 of FIG. 1.
Figure 8:
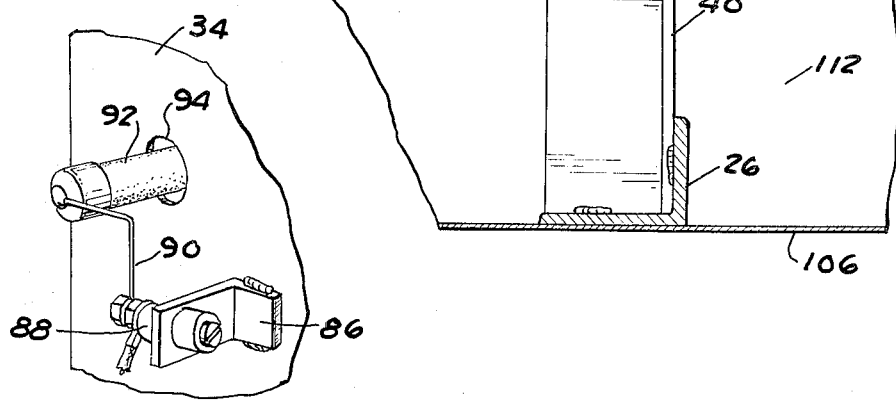
FIG. 8 is a fragmentary perspective view of a mounting for a heating element.

Each of these channels comprises a pair of generally semi-circular segments 58 and 60 welded to their respective supports as at 62 and 64 respectively. The advantage of this construction will appear below. The channel segments are spaced apart so that end portions 66 of reflectors 52 fit slidingly between them with a lateral clearance 68 (FIG. 9). There is also a longitudinal clearance 70 between the reflector ends and the bottoms of the panels as shown in FIGS. 6 and 7. The edges of the curved reflectors are flanged inwardly at 72 around the inner ends 74 of inner channel segment 58.

The edge portions of intermediate reflective panels 54 are flanged at 76, and these flanges have cut-away portions which are bent outwardly to provide tabs 78. The flanged edges of the intermediate panels fit within the ends of channels 56 adjacent ends 66 of the curved reflectors as shown in FIG. 9. Tabs 78 engage the forward inwardly flanged edges 72 of the curved reflectors. Reflectors 52 and panels 54 have about the same length so that there is also a longitudinal clearance 70 between the panel ends and the bottom of the supporting channels.

Figures 4, 5:
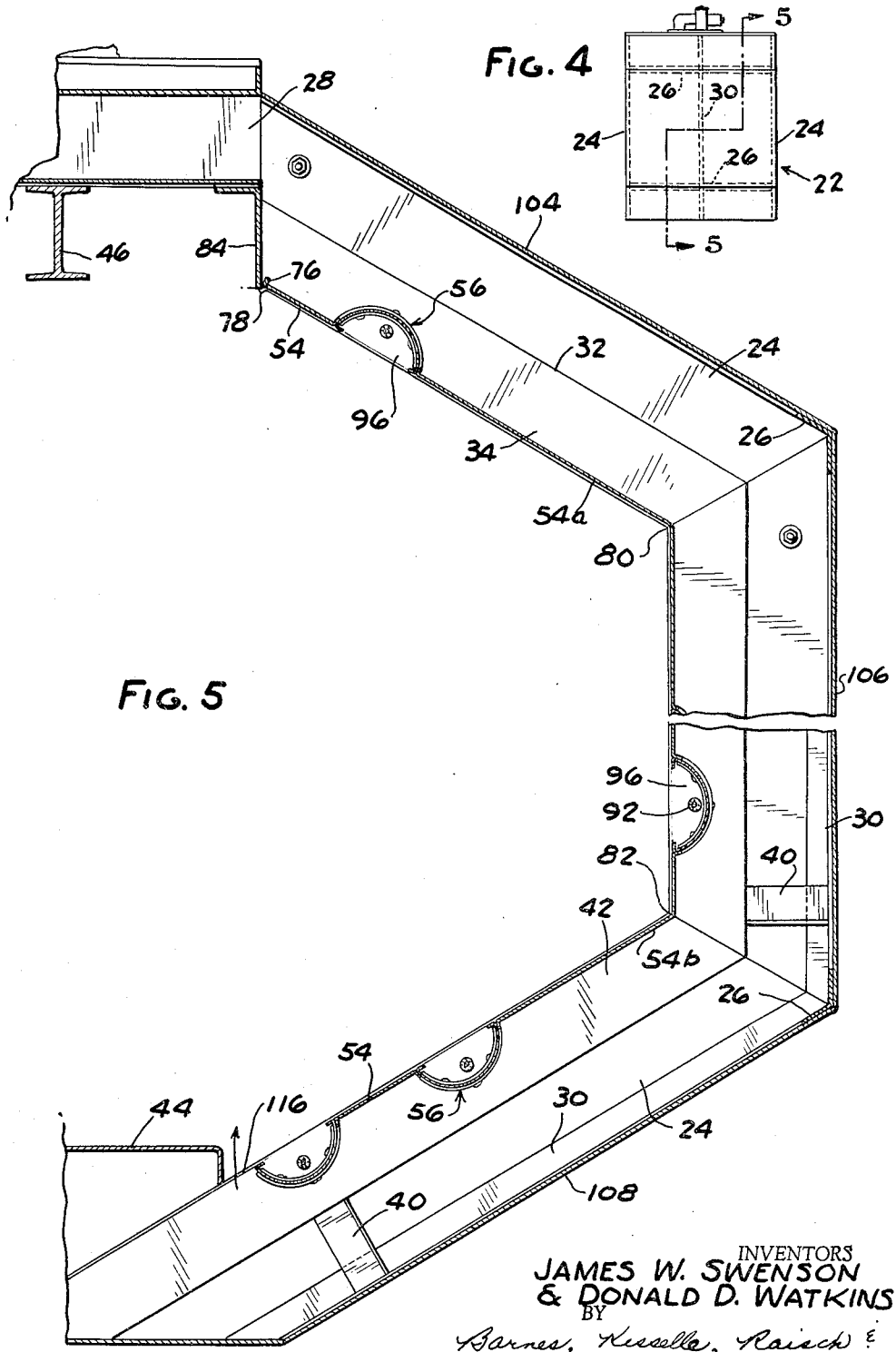
FIG. 4 is a small scale partly diagrammatic side elevation of a single oven section, parts being shown in phantom to illustrate structure.
FIG. 5 is an enlarged fragmentary sectional view on line 5—5 of FIG. 4.

The intermediate panels are shaped where necessary to conform to the general shape of the oven interior such as at corners 80 and 82. The shaped panels are denoted 54a and 54b respectively. Where a panel adjoins a frame member or the like 84 as shown in FIG. 5, its flanged edge 76 and tabs 78 may be utilized to secure it in place as shown. The flat panels, as well as curved reflectors 53, are formed of a relatively light weight easily handled inexpensive material such as sheet aluminum. Thus the flat panels, adjacent their flanged edges 76 or elsewhere, will be relatively easily laterally flexible to accommodate whatever lateral thermal expansion occurs when they become heated.

Frame legs 34 are provided with a number of vertically spaced welded brackets 86 which support insulators 88 for electrical contact and support wires 90 connected to radiant heating elements 92. These elements extend through frame openings 94 and extend within the concavities 96 of reflectors 52. The other ends 98 of these heating elements rest within openings 100 in channel walls 48 and 50 of intermediate channel 42. Thus the heating elements are free to shift because of thermal expansion relative to adjacent parts. Wiring for the heating elements at this location, represented at 102, is housed in channel 42 which may be closed by a removable cover plate 103. The heating elements may be either conventional quartz tubes or metal sheath heaters, and in the latter case, contact of the sheath with the bottom of hole 100 will provide a ground to the frame.

The various frame members carry outer housing panels 104, 106, and 108 which are secured in place by such 112 outside of the oven walls formed by reflectors 52 and 54. The passageway opens into a chamber 114 extending along the top of the oven section and also opens into the oven interior through longitudinal openings 116 adjacent the bottom of the oven.

The top of the oven communicates into a duct 118 which provides the inlet end of a conventional centrifugal fan 120 driven by a motor 122 having its outlet 124 opening into a stack 126 which communicates into chamber 114 to complete a circuitous path for recirculating air through the oven and passageway. Thus duct 118, fan 120 and its outlet 124 and the communicating portions of stack 126 and chamber 114 may be termed the upstream end portion of said passageway. A filter 128 is provided for cleaning the circulating air. Stack 126 is provided with a damper plate 130 adjustable to recirculate all of the air through the oven or to divert a portion of the air to an exhaust stack 132. The damper control is represented at 134.

A thermometer 136 is inserted into a portion of the means as bolting 110 to frame flanges 38 or intermediate frame members 26. These panels define a passageway recirculating air stream such as stack 126 for obtaining a continuous reading of the temperature of the air in the passageway.

In use a number of oven sections 22 can be secured together in end-to-end relation simply by bolting their end frame members 24 together as at 138. When this is done, the interiors of the individual oven sections form a continuous oven opening and the shoulder portions 32 and leg portions 34 of the adjacent end frame members cooperate to define a channel 140 opening toward the oven interior and containing wiring and insulator mountings for heater elements 92. This opening may be closed by a suitable plate 142 bolted to leg flanges 36 as at 144.

The welded mounting for channel segments 58 and 60 is advantageous in that, particularly in the limited spaces available for working, tack-welded connections are easier to form than would be bolted connections. Moreover, if it should become necessary to replace any of the reflective panels 52 or 54, it is only necessary to break tack weld 64; and this is far easier to do than to remove a bolt from the small space which may be available. To replace a panel, it is only necessary to slip it into place and again tack weld channel segment 60 into place. It will be appreciated that in some cases a similar procedure could be followed with respect to inner channel segment 58.

During use of the oven, the steel frame, aluminum reflective panels and heater elements will expand and contract thermally to different extents. The sliding fits of the panel elements and the heaters with the frame facilitates unobstructed thermal contraction and expansion.

When an article is subjected to radiant heat within the oven and its temperature rises, it heats the ambient air within the oven and the air is circulated by blower 120 through the oven interior and passageway 112. The temperature of the heated air is continually indicated by thermometer 136, and the thermometer is connected to suitable conventional electric controls which, according to the thermometer signal, regulate the current input to the heaters and thereby regulate the amount of heat radiated to the article in the oven. Thus, the article in the oven provides the primary control means for regulating the heat radiated to it. In short, the article controls its own temperature.

In the event that new air is to be drawn into the oven during a heating process, the oven ends are left open or partially open, and the damper plate 130 is fully or partially opened to exhaust a part of the heated air. To retain all of the air in the oven, its ends may be closed by suitable curtains (not shown), and the damper plate may be closed. The latter condition is particularly applicable where it is desired to control the oven temperature accurately within a few degrees.

To use merely one oven section as the complete oven, a plate (not shown) may be bolted over the frame end members 24 to form an end wiring channel half the size of channel 140, and this channel can be closed by a suitable cover. Similarly, a cover plate is secured over the exposed ends of an oven made up of several sections 22 to complete the half channel. Such cover plates may be extended inwardly as shown at 146 (FIG. 3) to limit the amount of new air entering the oven during a heating cycle.

We claim:

1. An industrial radiant heating oven comprising, means providing a frame having a plurality of spaced apart members, means providing a plurality of aligned opposed pairs of channels on said frame members with at least one leg of each channel having a break-away anchoring connection to its respective frame member, a plurality of reflectors formed of a material such as sheet metal having concave sides, each reflector extending longitudinally between a pair of said channels and having end portions supportedly engaged within its respective pair of channels, said end portions fitting in said channels with longitudinal and lateral clearance to facilitate differential thermal expansion of said reflectors and frame, radiant heating elements extending before the concave sides of said reflectors within the oven interior, said pairs of channels being positioned so that adjacent reflectors supported thereby are spaced apart, and reflective panel means formed of a material such as sheet metal having end portions supportedly engaged with said channels and thereby being supported in the spaces between adjacent reflectors, said end portions of said panel means having longitudinal clearance with respect to their respective supporting channels and having laterally flexible portions to facilitate thermal expansion thereof.

2. The combination defined in claim 1 wherein each channel is comprised of inner and outer legs shaped and positioned to accommodate the configuration of its reflector with at least a portion of one leg of each pair having a break-away fused metal connection to its frame member.

3. The combination defined in claim 2 wherein portions of said outer legs have said break-away connection to the frame member.

4. The combination defined in claim 2 wherein said reflectors have generally semi-cylindrical form and said channel legs comprise generally concentric adjacent inner and outer leg members, at least the outer one of which is tack welded to its frame member.

5. The combination defined in claim 1 wherein said reflective panel means have flanged edge portions which engage within said channels.

6. The combination defined in claim 5 wherein said flanged edge portions have spaced apart cut-away portions defining tabs which engage forward edge portions of the adjacent reflector.

7. An industrial radiant heating oven comprising, means providing a frame having a plurality of spaced apart members, a plurality of pairs of generally semi-circular elements tack welded to said frame members with each pair being spaced apart to define a channel, the channels on adjacent frame members being arranged in aligned opposed pairs, a plurality of generally semi-cylindrical concave-formed reflectors formed of a material such as sheet metal whose end portions fit within aligned channels with longitudinal clearance between the bottoms of said channels and lateral clearance between said channel elements to facilitate differential thermal expansion, radiant heating elements extending within the reflector concavities, and a plurality of reflective panels formed of a material such as sheet metal disposed between adjacent reflectors, said panels having flanged edge portions supportedly engaged within said channels and having other edge portions forming tabs which engage forward edge portions of adjacent reflectors, said panels having longitudinal clearance between the channel bottoms and having laterally flexible portions to facilitate thermal expansion.

8. An industrial radiant heating oven comprising, a frame which supports reflective panels which define wall portions of the oven interior, radiant heating elements disposed before certain of said reflective panels for heating an article disposed within the confines of the oven interior, housing panels mounted on said frame outwardly of said reflective panels so that said reflective panels and housing panels define a passageway, said passageway communicating into the oven interior, means operable to recirculate air through said passageway and oven interior so that the air is heated by the article in said oven, means operable to measure the temperature of the recirculating air whereby to obtain an indication of the temperature of the article, said last means being located outside of the confines of the oven interior and adjacent the upstream end portion of said passageway and means operable responsive to said temperature indication to regulate the output of said heating elements so that an article in said oven provides means which facilitates controlling the heat radiated thereto.

9. The method of heating an article to a predetermined temperature in an industrial radiant heating oven which comprises, placing said article in an oven enclosure, subjecting said article to radiated heat and thereby heating said article, circulating air in a closed circuitous path past said article while it is being thus heated and thereby using the heated article to heat the circulating air, continuously obtaining a measurement of the temperature of the circulating air at a point outside of the confines of the oven enclosure and adjacent the upstream end portion of said air path, and utilizing said temperature measurement to regulate the rate of energy supplied to the source of radiant heat, so that the article being heated provides means which facilitates controlling the amount of heat radiated thereto.

10. An industrial radiant heating oven having a frame of strong, rigid material such as steel, said frame including spaced-apart frame members, reflective members of light weight, relatively inexpensive reflective material such as aluminum having thermal expansion characteristics different from the material forming said frame, said reflective members extending longitudinally between support means adjacent said frame members, radiant heating elements disposed before certain of said reflective members, housing panels mounted on said frame outwardly of said reflective members so that said reflective members and panels define a passageway, said passageway communicating into the oven interior, means operable to recirculate air through said passageway and oven interior, said support means engaging said reflective members with a sliding interfit and with longitudinal and lateral clearance to facilitate differential thermal expansion of said frame members and reflective members.

11. A sectional industrial radiant heating oven comprising, a plurality of sections, each of which is constructed in accordance with claim 10, each of said sections having open end portions, the end portions of certain of said sections being disposed in adjacent relation, and means on the frame members of the adjacent open end portions operable to interconnect said adjacent end portions so that the interiors of the adjacent oven sections form a continuous oven.

12. The combination defined in claim 11 wherein the frame members adjacent said certain end portions have partial channel configuration which cooperate with frame members of the adjacent oven section to form a channel which houses wiring for said radiant heating elements.

References Cited by the Examiner

UNITED STATES PATENTS

| | | | |
|---|---|---|---|
| 1,896,910 | 2/33 | Merkt. | |
| 1,944,449 | 1/34 | Munro | 263—1 |
| 2,040,328 | 5/36 | Olson. | |
| 2,439,005 | 4/48 | Jensen | 219—354 X |
| 2,472,293 | 6/49 | Groven | 219—354 X |
| 2,504,516 | 4/50 | Goodell | 219—400 |
| 2,521,232 | 9/50 | Lashells | 219—354 |
| 2,807,890 | 10/57 | Stone | 34—48 |
| 2,841,684 | 7/58 | Miskella | 219—350 |
| 2,898,437 | 8/59 | McFarland | 219—421 |
| 3,002,287 | 10/61 | Smith | 34—77 |
| 3,003,409 | 10/61 | Mills | 219—411 |
| 3,009,256 | 11/61 | Lynch | 34—45 |
| 3,051,820 | 8/62 | Krichton | 219—377 |

RICHARD M. WOOD, *Primary Examiner.*

ANTHONY BARTIS, *Examiner.*